Sept. 17, 1929.   B. CHRISTIANSEN   1,728,784
METHOD OF REDUCING ORES
Filed Dec. 19, 1928
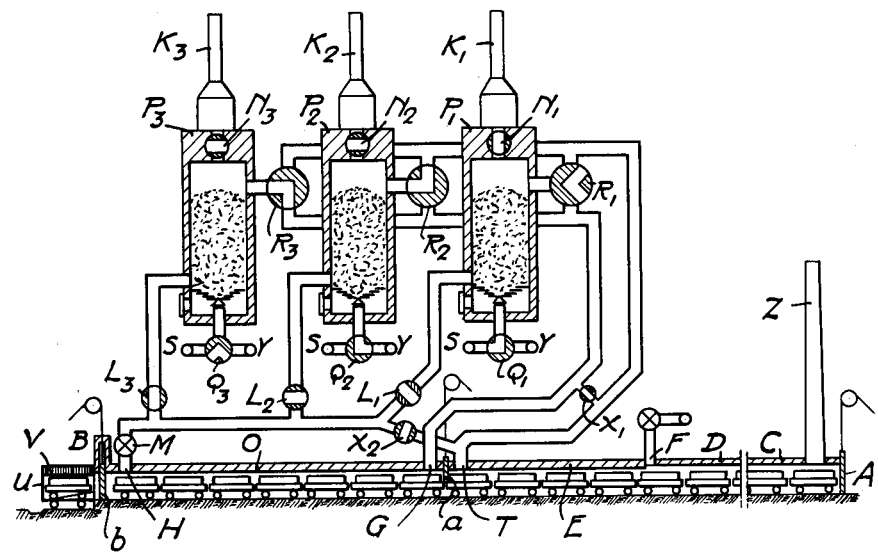

Patented Sept. 17, 1929

1,728,784

UNITED STATES PATENT OFFICE

BROR CHRISTIANSEN, OF SMEDJEBACKEN, SWEDEN

METHOD OF REDUCING ORES

Application filed December 19, 1928, Serial No. 327,022, and in Sweden December 23, 1927.

This invention relates to the reduction of ores in reduction furnaces in which the ore successively passes through preheating, prereduction, and final reduction zones the ore being subjected in the final reduction zone to the action of circulating reducing gases which are regenerated outside the reduction furnace by being conveyed through incandescent carbon in recarbonizing furnaces. It has been proposed to heat such recarbonizing furnaces electrically or by external heating and finally by hot blasting them periodically by means of air. It has further been proposed to heat the recarbonizing furnaces by partial combustion of the excess of gas obtained in the process or a portion thereof the resulting still combustible gas being drawn off to the prereduction and preheating zones.

The object of the invention is to render such ore reduction processes more economic by regenerating the circulating gases in a cheap manner and producing at the same time a gas rich in hydrogen for the prereduction and preheating of the ore. The invention consists, chiefly, in regenerating the circulating gas by passing it through a recarbonizing furnace, supplying steam simultaneously to another recarbonizing furnace for the generation of water gas required for the prereduction and hot blasting at the same time a third recarbonizing furnace and shifting at intervals the operation of said recarbonizing furnaces.

The recarbonizing furnace just hot blasted has a temperature, for instance, of 1500° C. and is then cut in into the circulation system. The regeneration reaction $CO_2 + C = 2CO$ takes place therein while the temperature falls. When the temperature has sunk to a certain limit which is about 1200° C. for coke and 1000° C. for charcoal the reaction ceases and, therefore, the recarbonizing furnace is cut off from the circulation system and steam is supplied to it to form water gas according to the formula: $H_2O + C = H_2 + CO$ while the temperature falls still more. The last-mentioned reaction begins to cease at a temperature of about 850° C. and then the steam supply is cut off and new fuel is filled into the recarbonizing furnace and the furnace is hot blasted again.

In the accompanying drawing a longitudinal section of a channel furnace for the production of spongy iron is shown in which circulating gas and water gas are produced according to the invention.

A is the introduction end of the channel furnace and B the discharge end thereof. Next to the introduction end is a preheating zone C and then a roasting zone D and a prereduction zone E follow. The ore to be reduced is loaded on carriages lined with refractory material and introduced through the introduction end A. Preferably the ore is pressed to briquettes and loaded in this form on the carriages, which are moved intermittently through the furnace. At T water gas is introduced which is obtained from the recarbonizing furnaces described herebelow and at F an excess of preferably preheated air is supplied by means of which the gas supplied at T is combusted in the zone D, whereupon the combustion gases pass the zone C and escape through the chimney Z. In the zone C the ore is preheated and thereafter it is subjected to roasting in the zone D and to prereduction in the zone E. From the prereduction zone the briquettes consisting now essentially of Fe and FeO are fed into the final reduction zone O separated from the prereduction zone by means of a refractory shutter $a$. From the final reduction zone O the carriages are taken out into a cooling carriage U through a shutter $b$ which thereafter is closed to shut off the carriage U from the furnace. The cooling carriage is externally cooled by means of a water sprinkling apparatus V. After complete cooling the ore carriages are taken out therefrom.

In the final reduction zone a current of carbon monoxide is introduced at G, the temperature of which at the entrance may be for instance 1000 to 1100° C. The briquettes have, preferably, at least the same temperature at their entrance in the zone O and, therefore, the reduction proceeds rapidly as the remaining oxygen in the briquettes reacts with a portion of the carbon monoxide to carbon dioxide. This reaction, however, ceases when the state of equilibrium between the carbon dioxide formed and the remaining carbon monoxide at the prevailing temperature is reached. The circulating gas is thereafter drawn off from the final reduction zone at H by means of the fan M and is led alternately to one of the three recarbonizing furnaces $P_1$, $P_2$ and $P_3$ which are filled with coke or other carbon fuel. The said furnaces are operated alternately in such manner that one is hot blasted and filled with fuel, one is used for the regeneration of the circulating gases and one is used for the generation of water gas.

Through valves $L_1$, $L_2$ and $L_3$ the circulating gas can be led to any of the recarbonizing furnaces and through valves $R_1$, $R_2$ and $R_3$ it can be led into the final reduction zone O and the water gas into the prereduction zone E. Through the valves $Q_1$, $Q_2$ and $Q_3$ air is supplied through the pipe S and steam through the pipe Y, respectively. During the hot blasting the combustion gases escape through the valves $N_1$, $N_2$ and $N_3$, through which also new fuel is supplied, and then through the chimneys $K_1$, $K_2$ or $K_3$ to the open air.

In the position of the valves L, Q, R and N shown in the figure, the recarbonizing furnace $P_1$ is hot blasted, $P_2$ generates water gas and $P_3$ regenerates the circulating gases. In the recarbonizing furnace $P_1$ air is, consequently, blown in from the pipe S through the valve $Q_1$ and the escaping gases essentially consisting of $CO_2$ and $N_2$ are drawn off through $N_1$ to the chimney $K_1$. At this the valve $R_1$ is shut. If an excess of circulating gas is obtained in the circulation system, said excess or a portion thereof may be introduced into the furnace $P_1$ by opening the valve $L_1$ and combusted therein aiding to heat its carbon layer.

Into the recarbonizing furnace $P_2$ steam is introduced from the pipe Y through the valve $Q_2$ and the resulting water gas is drawn off through the valve $R_2$ to T and the prereduction zone E. At this the valve $N_2$ is kept closed. Also into this furnace a portion of the excess of gas from the circulating system may be introduced by opening the valve $L_2$ and thereby the quantity of gas for the prereduction is increased.

The current of circulating gas is conducted through the recarbonizing furnace $P_3$ and returned through the valve $R_2$ to G and the final reduction zone O. The valves $N_3$ and $Q_3$ are closed.

The valves are in the positions described above for a suitable period which may be called the 1st period and thereafter they are shifted thus: During the next period, the 2nd period, the furnace $P_1$ is connected with the circulation system while the furnace $P_3$ is caused to generate water gas by means of steam supplied and the furnace $P_2$ is filled with new fuel and hot blasted.

During the next or 3rd period the furnace $P_1$ is caused to produce water gas, while the furnace $P_3$ is filled with new fuel and hot blasted and the furnace $P_2$ is connected with the circulation system.

When the valves are shifted again the first period is repeated etc.

The valves for directing the gas currents are in the drawing shown as independent of each other. In practice they are preferably coupled together in a suitable manner so that they can be shifted in a very simple manner.

The excess of gas obtained when the circulating gas is regenerated by the reduction of the carbon dioxide to carbon monoxide may also be directly drawn off to the prereduction zone from the circulation system either from the conduit leading to G through a conduit $X_1$ or from the conduit coming from H through a conduit $X_2$. In the first case the gas drawn off has been regenerated and is very rich in carbon monoxide in the latter case it is relatively poor in carbon monoxide.

When fuel containing sulphur is used finely crushed lime-stone is admixed to the fuel. The grains should have such maximum size that there is sufficient time for the lime-stone to be roasted or calcined during the hot blasting period and the carbon dioxide thus formed follows the combustion gases. For instance, with a hot blasting period of 5 minutes the maximum size of the grains should be 5 mm.

The remaining lime then directly absorbs sulphur from the coke and from the circulating gas and the water gas. If the lime-stone used is not sufficiently finely ground the pieces thereof are not roasted thoroughly during the hot blasting period and, therefore, carbon dioxide is also driven off from the limestone during the regeneration period and decreases the reducing property of the reduction gases. Limestone has no desulphurizing power until after it has been roasted to CaO.

The heat necessary for the regeneration of the circulating gas and for the production of water gas is obtained in the process described above from the physical heat accumulated in the fuel in the recarbonizing furnaces after the hot blasting.

The invention is based upon the well-known fact that the reaction $CO_2 + C = 2CO$ does not proceed satisfactorily below about 1200° C. for coke and 1000° C. for charcoal which are the fuels commonly used, while the reaction $H_2O + C = H_2 + CO$ proceeds satisfactorily down to a temperature of 850° for said fuels. If the fuel mass has got a temperature of 1500° C. when hot blasted the reaction $CO_2 + C = 2CO$ takes place during the most suitable interval of temperature between about 1500° C. and about 1200° C. or 1000° C. respectively. Thereafter the reaction $H_2O+C=H_2+CO$ proceeds between about 1200° or 1000° and about 850° C.

An essential novel feature of the invention is implied in the fact that those reactions are performed in the same recarbonizing furnaces, so that the same fuel mass is utilized two times after every hot blasting period and a good economy as to the consumption of fuel and simple arrangements are obtained.

If the circulating gas and the water gas are to be produced separately, it is necessary to use two recarbonizing furnaces as well as two alternately operated water gas generators or together four furnaces which must be hot blasted separately. Instead of this three furnaces are used according to the invention, which are hot blasted only once for the two periods of operation in which the circulating gas and the water gas are produced.

My invention is not limited to be used in combination with channel furnaces but may also be applied to shaft furnaces or other furnaces in which reduction by means of circulating gases containing carbon monoxide can be performed.

What I claim is:—

1. Method of continuously reducing ores, which comprises passing the ore successively through preheating, prereduction and final reduction zones of a reduction furnace, subjecting the ore in the final reduction zone to the action of circulating reducing gases and in the prereduction zone to the reducing action of water gas, regenerating said circulating gases by passing them through a recarbonizing furnace, supplying steam simultaneously to another recarbonizing furnace, for the generation of water gas required for the prereduction, hot blasting a third recarbonizing furnace at the same time, and shifting at intervals the operation of said recarbonizing furnaces.

2. Method of continuously reducing ores, which comprises passing the ore successively through preheating, prereduction and final reduction zones of a reduction furnace, subjecting the ore in the final reduction zone to the action of circulating reducing gases and in the prereduction zone to the reducing action of water gas, regenerating said circulating gases by passing them through a recarbonizing furnace, supplying steam simultaneously to another recarbonizing furnace for the generation of water gas required for the prereduction, mixing said water gas with an excess of gas obtained in the circulation system, hot blasting a third recarbonizing furnace at the same time, and shifting at intervals the operation of said recarbonizing furnaces.

3. Method of continuously reducing ores, which comprises passing the ore successively through preheating, prereduction and final reduction zones of a reduction furnace, subjecting the ore in the final reduction zone to the action of circulating reducing gases and in the prereduction zone to the reducing action of water gas, regenerating said circulating gases by passing them through a recarbonizing furnace, supplying steam simultaneously to another recarbonizing furnace for the generation of water gas required for the prereduction, hot blasting a third recarbonizing furnace at the same time, drawing off the excess of gas obtained in the circulation system through said second and third recarbonizing furnaces, and shifting at intervals the operation of said three recarbonizing furnaces.

In testimony whereof I have signed my name.

BROR CHRISTIANSEN.